United States Patent
Hsu

(10) Patent No.: US 9,837,755 B2
(45) Date of Patent: Dec. 5, 2017

(54) WATERPROOF BUSHING CONNECTOR ASSEMBLY, WATERPROOF BUSHING RECEPTACLE CONNECTOR AND WATERPROOF BUSHING PLUG CONNECTOR

(71) Applicant: Advanced-Connectek Inc., New Taipei (TW)

(72) Inventor: Huan-Pin Hsu, New Taipei (TW)

(73) Assignee: ADVANCED-CONNECTEK INC. (TW)

( * ) Notice: Subject to any disclaimer, the term of this patent is extended or adjusted under 35 U.S.C. 154(b) by 0 days.

(21) Appl. No.: 15/470,859

(22) Filed: Mar. 27, 2017

(65) Prior Publication Data
US 2017/0288335 A1    Oct. 5, 2017

(30) Foreign Application Priority Data
Mar. 31, 2016   (TW) .............................. 105204545 A

(51) Int. Cl.
*H01R 13/40*   (2006.01)
*H01R 13/52*   (2006.01)

(52) U.S. Cl.
CPC ..... *H01R 13/5205* (2013.01); *H01R 13/5219* (2013.01); *H01R 13/52* (2013.01); *H01R 13/5202* (2013.01)

(58) Field of Classification Search
CPC .................. H01R 13/5202; H01R 13/5205
USPC .................................. 439/587, 588, 589
See application file for complete search history.

(56) References Cited

U.S. PATENT DOCUMENTS

| | | | | |
|---|---|---|---|---|
| 6,152,608 | A * | 11/2000 | Ghara | G02B 6/3893 385/60 |
| 6,648,520 | B2 * | 11/2003 | McDonald | G02B 6/3869 385/59 |
| 6,962,445 | B2 * | 11/2005 | Zimmel | G02B 6/3825 385/55 |
| 7,914,306 | B1 * | 3/2011 | Blackwell | H01R 13/5213 439/135 |

* cited by examiner

*Primary Examiner* — Phuong Dinh
(74) *Attorney, Agent, or Firm* — Hershkovitz & Associates, PLLC; Abe Hershkovitz

(57) ABSTRACT

A waterproof bushing connector assembly has a waterproof bushing receptacle connector having a receptacle housing assembly, a receptacle bushing module and an optical receptacle connector, and a waterproof bushing plug connector engaged detachably with the waterproof bushing receptacle connector and having a plug housing assembly, a plug bushing module, an optical plug connector and a rear mounting lid. The bushing designs allow different optical receptacle connectors to be replaced on an electrical device easily and conveniently.

12 Claims, 16 Drawing Sheets

WATERPROOF BUSHING CONNECTOR ASSEMBLY, WATERPROOF BUSHING RECEPTACLE CONNECTOR AND WATERPROOF BUSHING PLUG CONNECTOR

BACKGROUND OF THE INVENTION

1. Field of the Invention

The present invention relates to a connector assembly, and more particularly to a waterproof bushing connector assembly that is able to be mounted on an electrical device and has a waterproof bushing receptacle connector and a waterproof bushing plug connector. Each of the bushing receptacle and plug connectors has a bushing module to allow replacement of an optical receptacle or optical plug connector inside. Therefore, a casing of the electrical device needs no modification for adapting different optical receptacle or optical plug connectors.

2. Description of Related Art

Plug connectors and receptacle connectors are common electronic components widely used in electrical devices. By installing receptacle and plug connectors respectively on an electrical device and a distal end of a cable of another electrical device, the receptacle and plug connectors may be engaged to allow signal transmission and power supply between the electrical devices.

Under some specific circumstances, electrical devices are designed in series with similar or identical outer casings. Internal circuit boards and external connectors of the series of electrical devices are different. Although the casings are similar, installation holes therein are modified and different for accommodation of the external connectors. Thus, different manufacturing processes are implemented on the outer casings for different external connectors, which increases the manufacturing cost of the electrical devices.

Furthermore, some electrical devices are used for outdoors or humid environments. However, external connectors of these outdoor electrical devices have openings and lack waterproof ability. Therefore, in the outdoors or humid environments, moisture easily passes through the connectors into the internal spaces of the electrical devices and corrodes circuit boards and relative electronic components. The issues of lacking waterproof of the connectors need to be solved.

To overcome the shortcomings, the present invention provides a waterproof bushing connector assembly, a waterproof bushing receptacle connector and a waterproof bushing plug connector to mitigate or obviate the aforementioned problems.

SUMMARY OF THE INVENTION

The main objective of the invention is to provide a waterproof bushing connector assembly that is able to be mounted on an electrical device and has a waterproof bushing receptacle connector and a waterproof bushing plug connector. Each of the bushing receptacle and plug connectors has a bushing module to allow replacement of a receptacle or optical plug connector inside. Therefore, a casing of the electrical device needs no modification for adapting different receptacle or optical plug connectors.

A waterproof bushing connector assembly in accordance with the present invention comprises a waterproof bushing receptacle connector having a receptacle housing assembly, a receptacle bushing module and an optical receptacle connector, and a waterproof bushing plug connector engaged detachably with the waterproof bushing receptacle connector and having a plug housing assembly, a plug bushing module, an optical plug connector and a rear mounting lid. The bushing designs allow different optical receptacle connectors to be replaced on an electrical device easily and conveniently.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
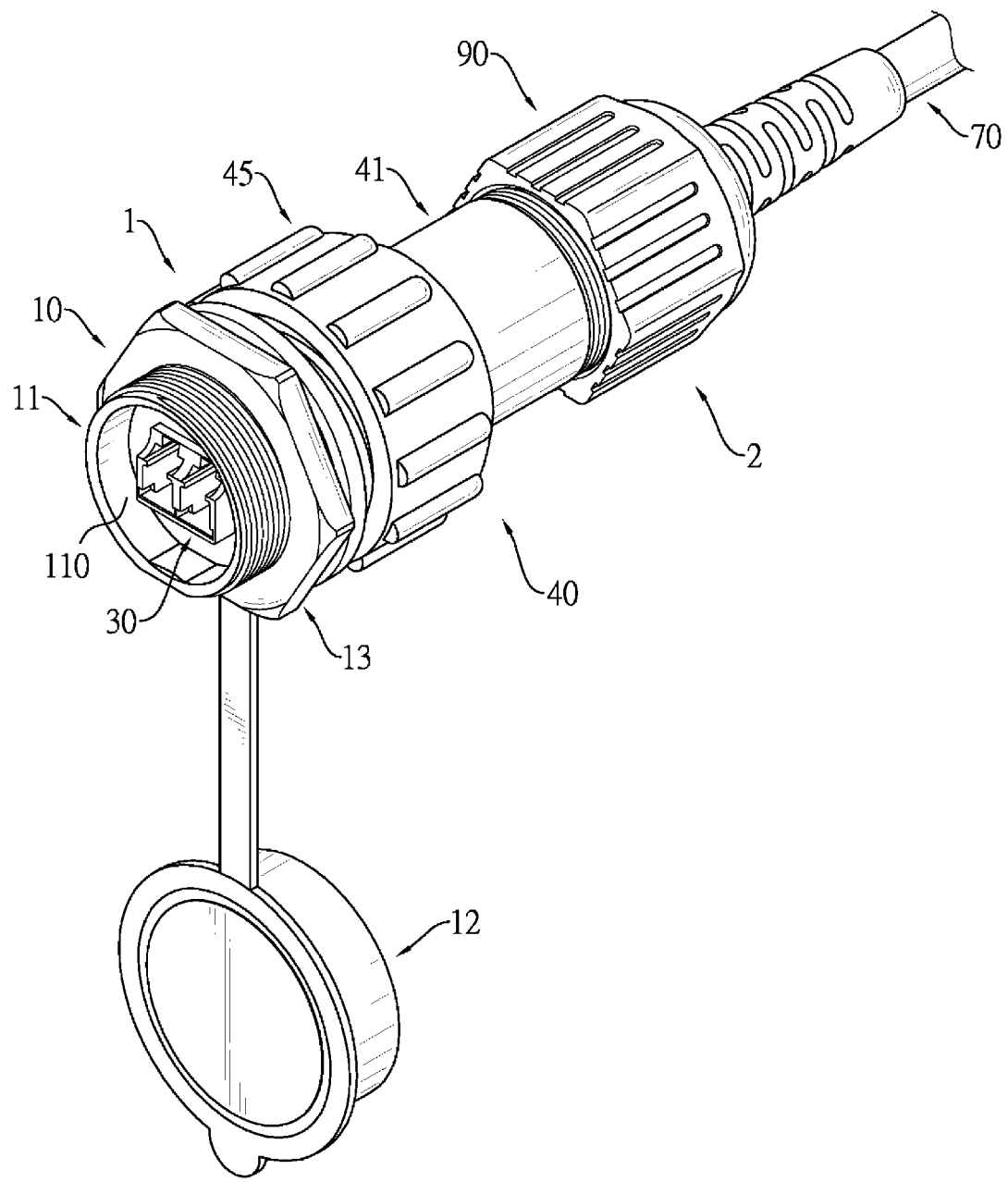
FIG. 1 is a perspective view of a waterproof bushing connector assembly in accordance with the present invention.
Figure 2:
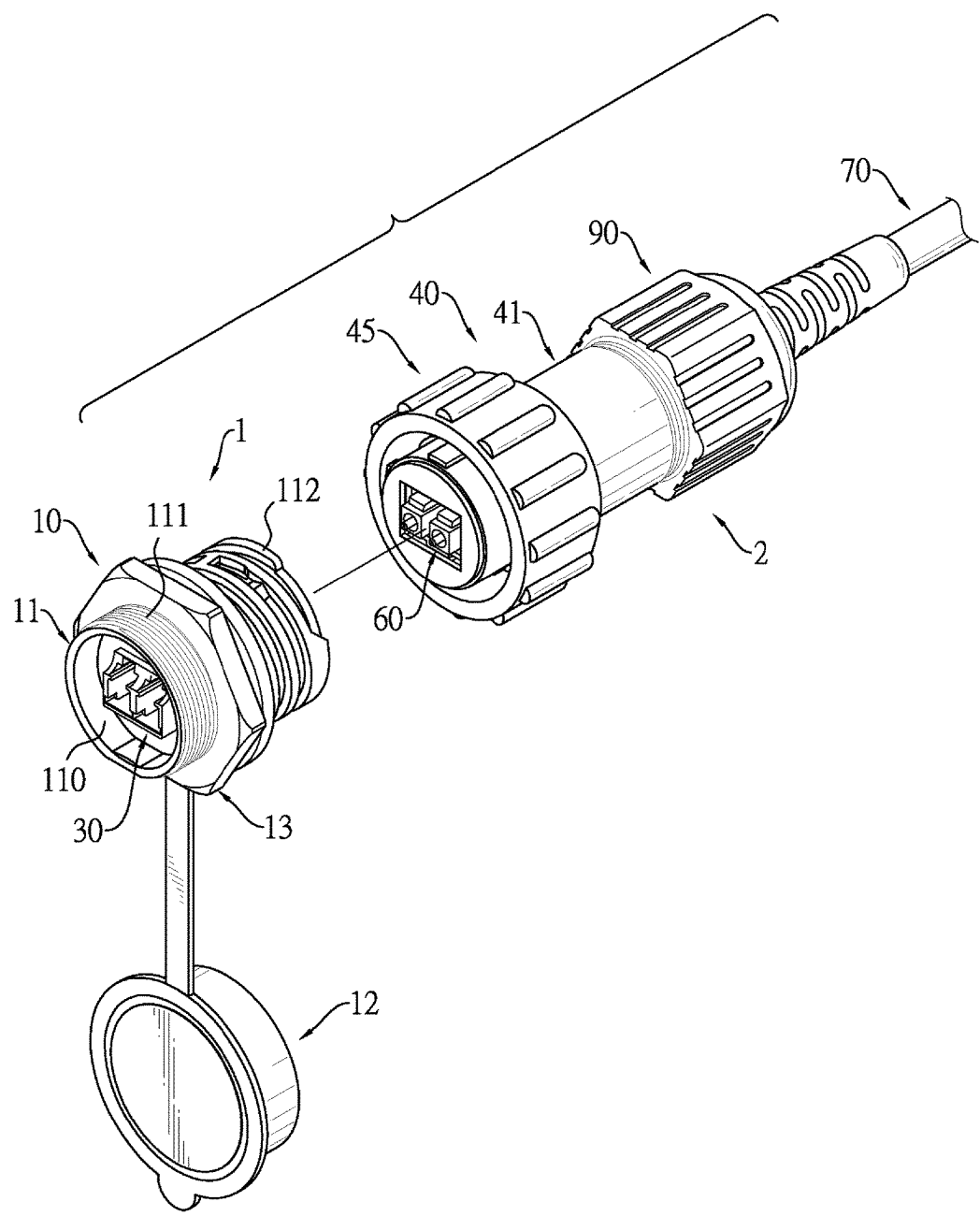
FIG. 2 is a partially exploded perspective view of the waterproof bushing connector assembly in FIG. 1.
Figure 3:
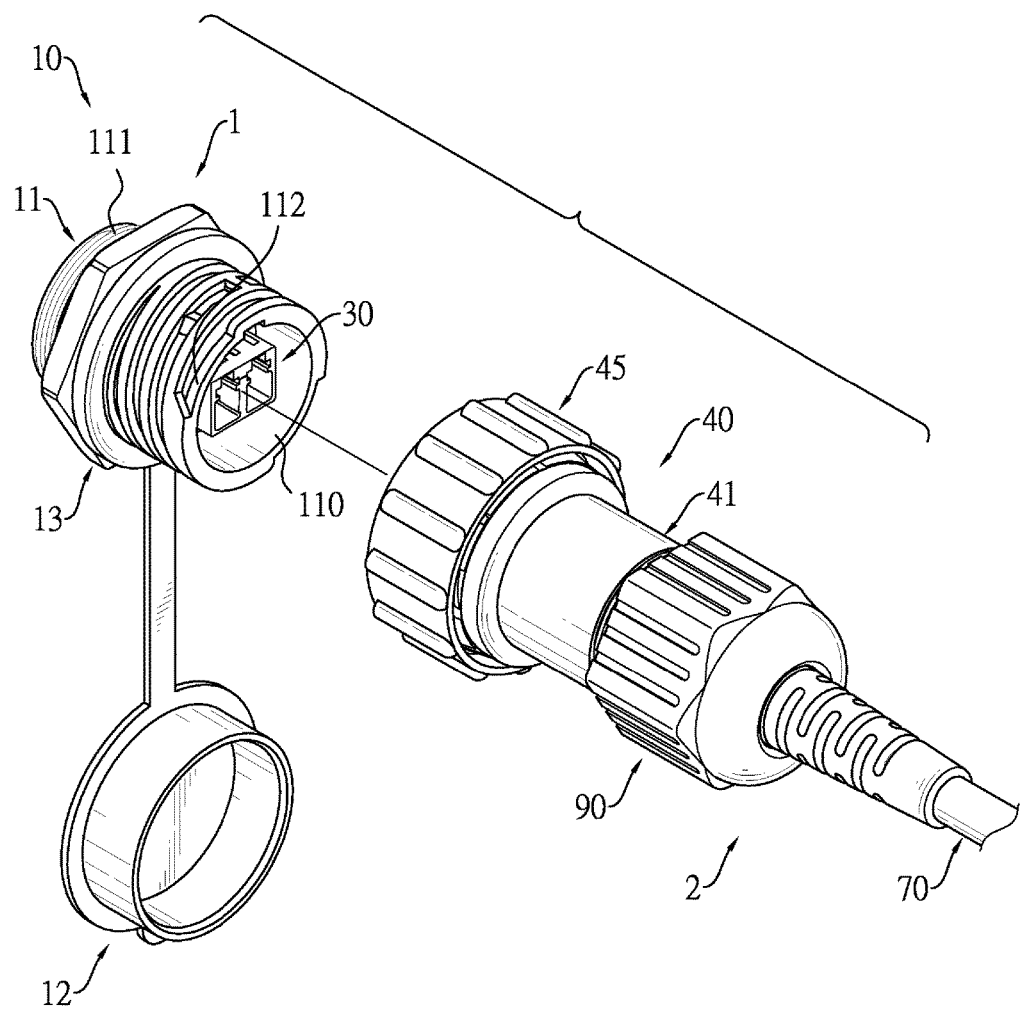
FIG. 3 is another partially exploded perspective view of the waterproof bushing connector assembly in FIG. 1.

With reference to FIGS. 1 to 3, a waterproof bushing connector assembly comprises a waterproof bushing receptacle connector 1 and a waterproof bushing plug connector 2.

Figure 4:
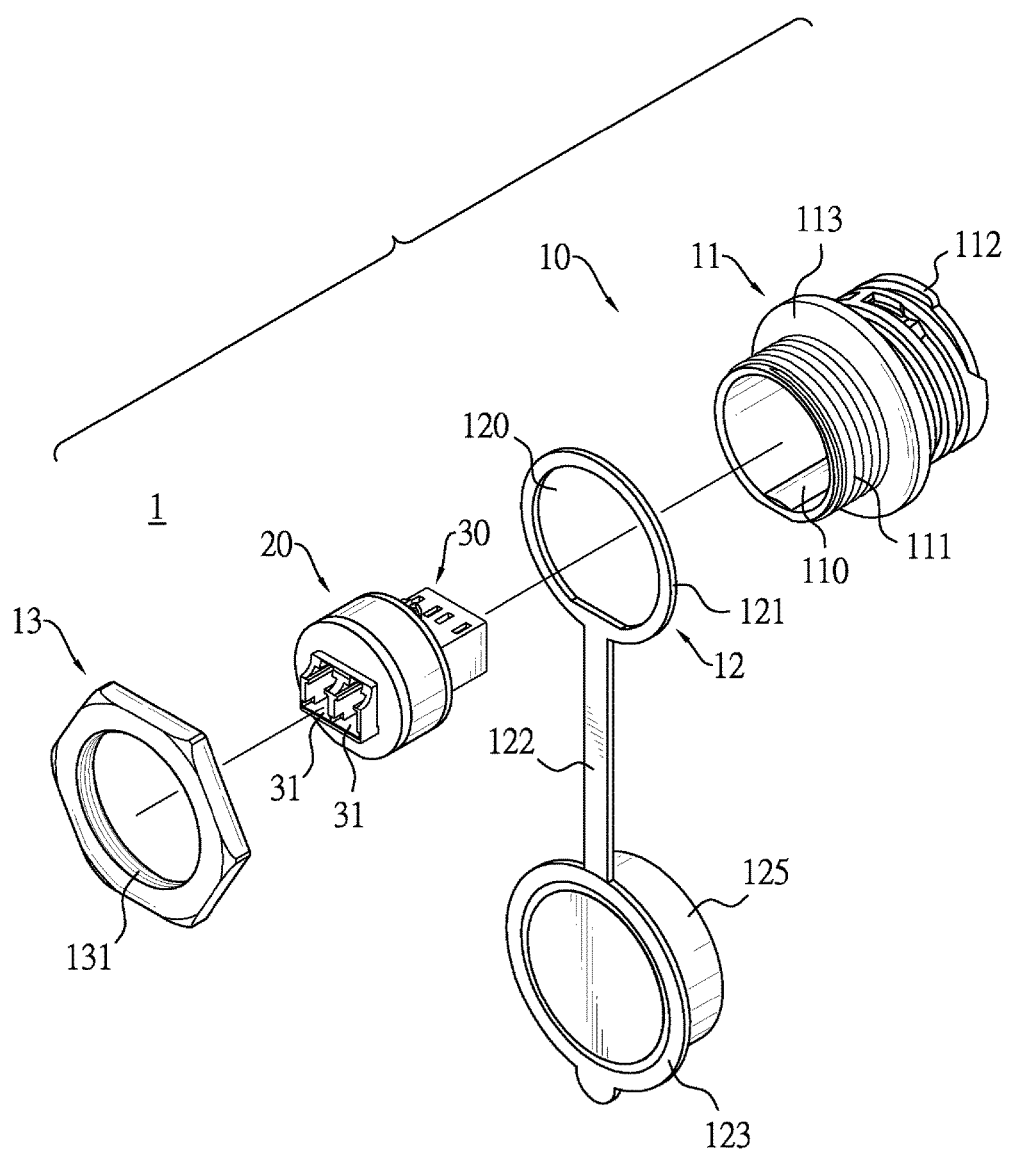
FIG. 4 is a partially exploded perspective view of a waterproof bushing receptacle connector of the waterproof bushing connector assembly in FIG. 1.
Figure 5:
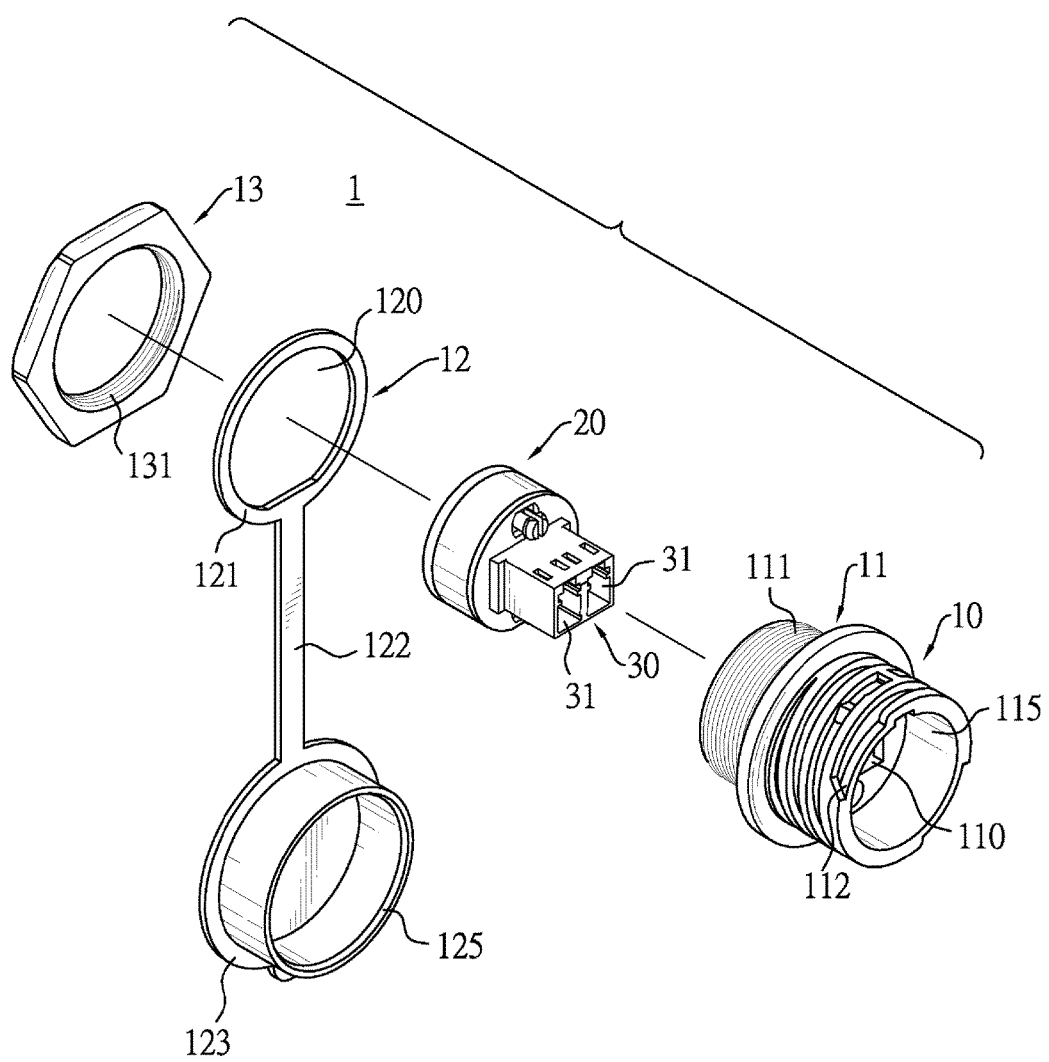
FIG. 5 is another partially exploded perspective view of a waterproof bushing receptacle connector of the waterproof bushing connector assembly in FIG. 1.

With further reference to FIGS. 4 and 5, the waterproof bushing receptacle connector 1 has a receptacle housing assembly 10, a receptacle bushing module 20 and an optical receptacle connector 30.

The receptacle housing assembly 10 has a receptacle housing 11, a protective cap unit 12 and a mounting collar or gland nut 13.

The receptacle housing 11 has a first cavity 110, an engaging portion 112, an outer threaded coupling 111 and a flange 113. The first cavity is defined through the receptacle housing 11. The engaging portion 112 is formed in an outer periphery on a rear end of the receptacle housing 11 and has multiple first limiting teeth formed on the engaging portion 112. The outer threaded coupling 111 is formed in an outer periphery on a front end side of the receptacle housing 11. The flange 113 is formed between the engaging portion 112 and the outer threaded coupling 111.

Figure 9:
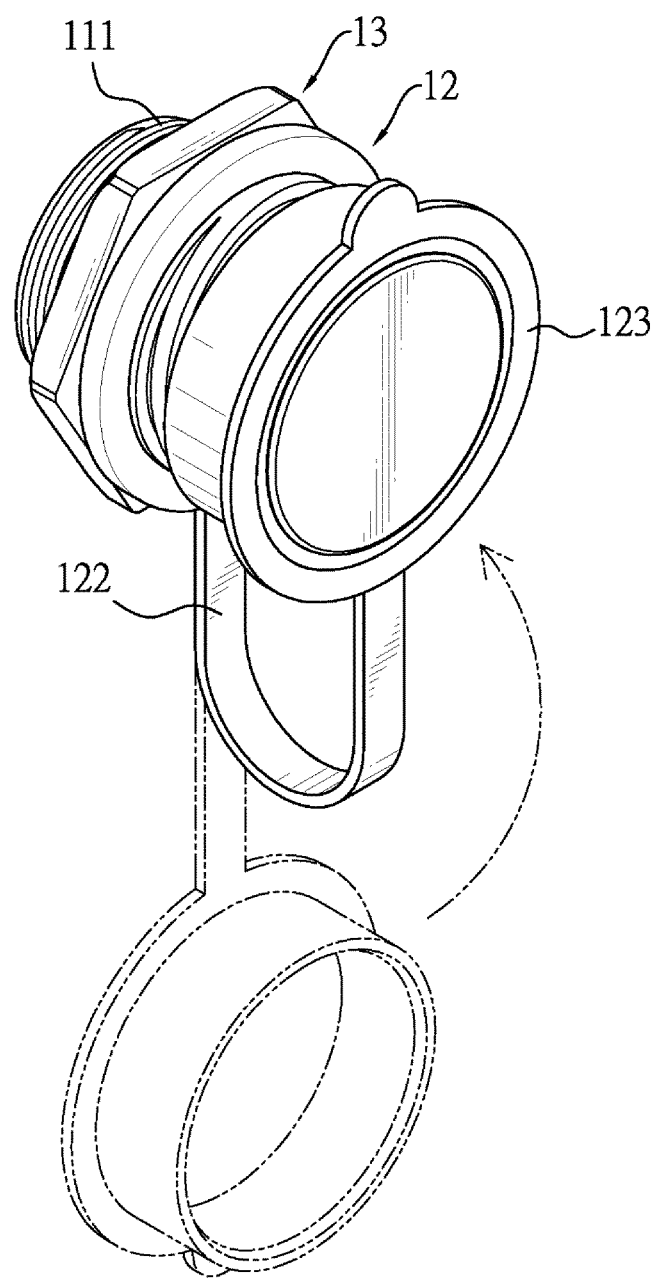
FIG. 9 is an operational perspective view of the waterproof bushing receptacle connector in FIG. 4 covered with a protective cap.

With further reference to FIG. 9, the protective cap unit 12 is tethered to the receptacle housing 11. The protective cap unit 12 has an elastic ring 121, a strap 122 and a protective cap 123. The elastic ring 121 is to tether the protective cap unit 12 to the receptacle housing 11 by the strap 122. The elastic ring 121 has a ring hole 121 defined through the elastic ring 121 and is disposed around the receptacle housing 11. The strap 122 is formed and protrudes from the elastic ring 121. The protective cap 123 is formed on a distal end of the strap 122 and has a cylindrical outer surface 125 formed on the protective cap 123 and detachably mated with the first cavity 110 on the rear end of the receptacle housing 11. That is, the cylindrical outer surface 125 of the protective cap 123 is mated with the first cavity 110 on the rear end of the engaging portion 112 of the receptacle housing 11.

The mounting collar or gland nut 13 is mounted detachably around the front end of the receptacle housing 11 The mounting collar or gland nut 13 is utilized to press the protective cap unit 12 tightly against the flange 113 of the receptacle housing 11. The mounting collar or gland nut 13 has an inner thread 131 and is engaged with the outer threaded coupling 111 of the receptacle housing 11.

Figure 6:
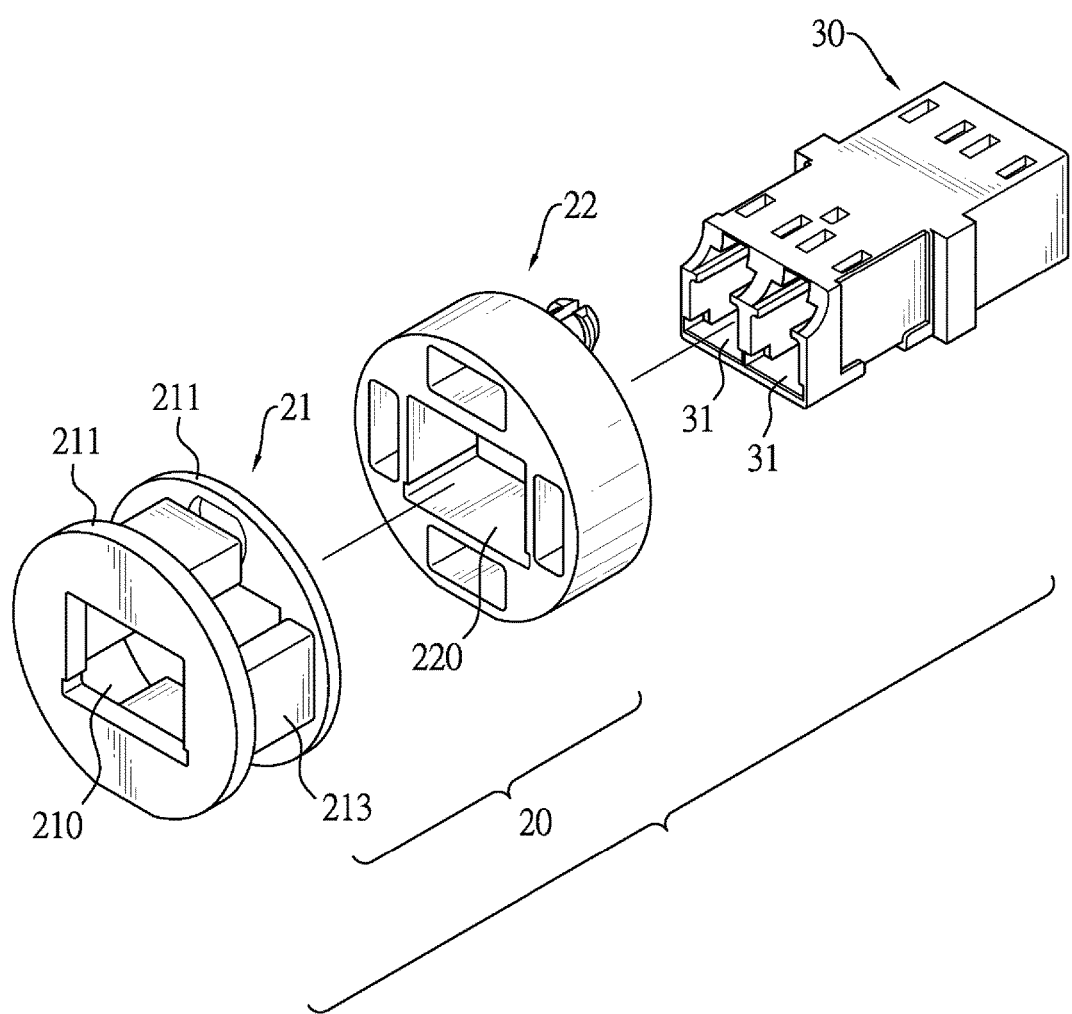
FIG. 6 is an exploded perspective view of a receptacle bushing module and an optical receptacle connector of the waterproof bushing receptacle connector in FIG. 4.
Figure 7:
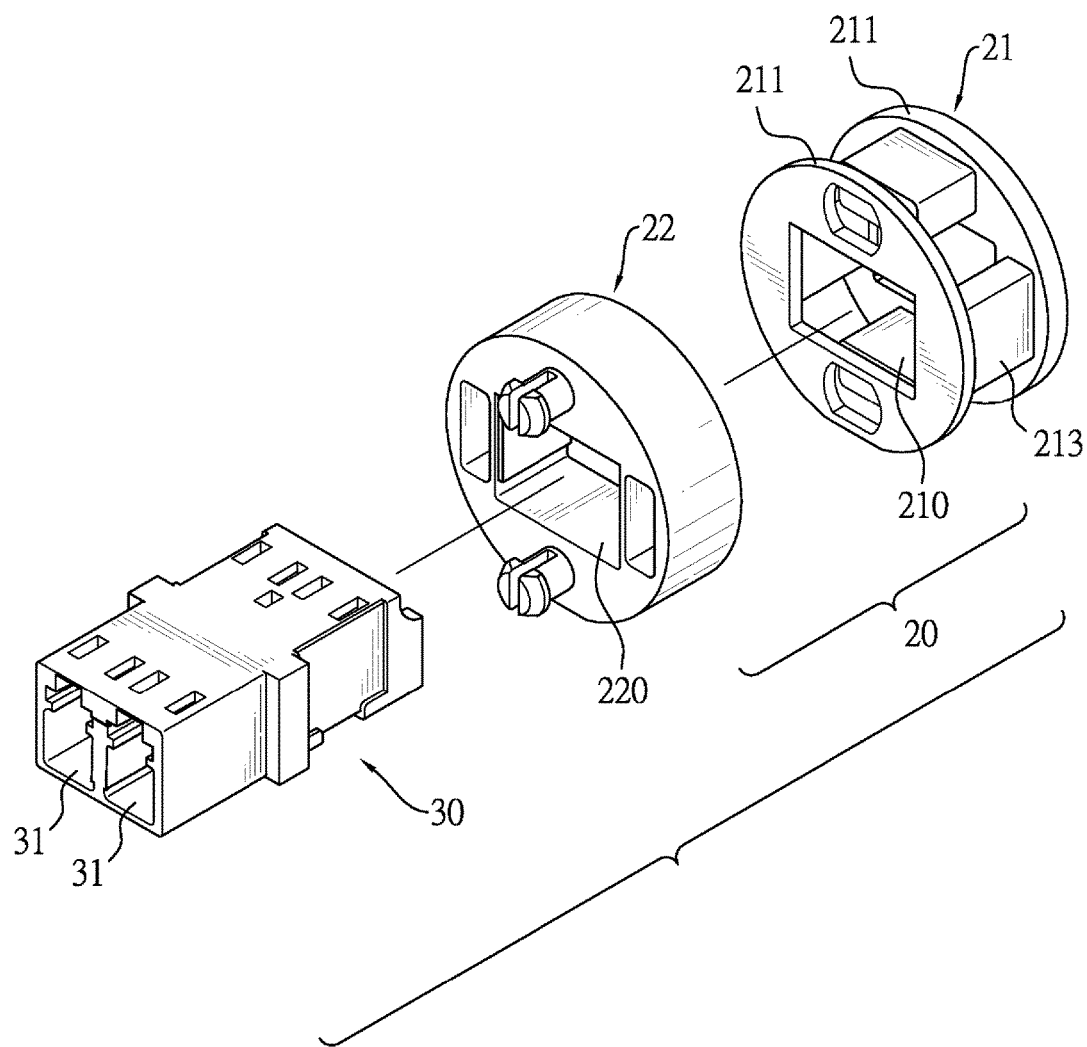
FIG. 7 is another exploded perspective view of the receptacle bushing module and the optical receptacle connector of the waterproof bushing receptacle connector in FIG. 4.

With further reference to FIGS. 6 and 7, the receptacle bushing module 20 is coupled detachably to the first cavity 110 of the receptacle housing 11 and has an outer receptacle bushing 21 and an inner receptacle bushing 22.

The outer receptacle bushing 21 has an outer assembling hole 210, two opposite disks 211 and multiple connecting beams 213. The outer assembling hole 210 is defined through the outer receptacle bushing 21. The disks 211 are formed on the outer receptacle bushing 21. The connecting beams 213 are formed between the disks 211.

The inner receptacle bushing 22 has an inner assembling hole 220 defined through the inner receptacle bushing 22 and communicating with the outer assembling hole 210. Preferably, the inner receptacle bushing 22 is mounted between the disks 211 of the outer receptacle bushing 21 by insert-molding processes. More specifically, the inner receptacle bushing 22 is made by a first insert-molding process, and then the outer receptacle bushing 21 is mounted securely on the inner receptacle bushing 22 by a second insert-molding process. The connecting beams 213 extend through the inner receptacle bushing 22.

Figure 8:
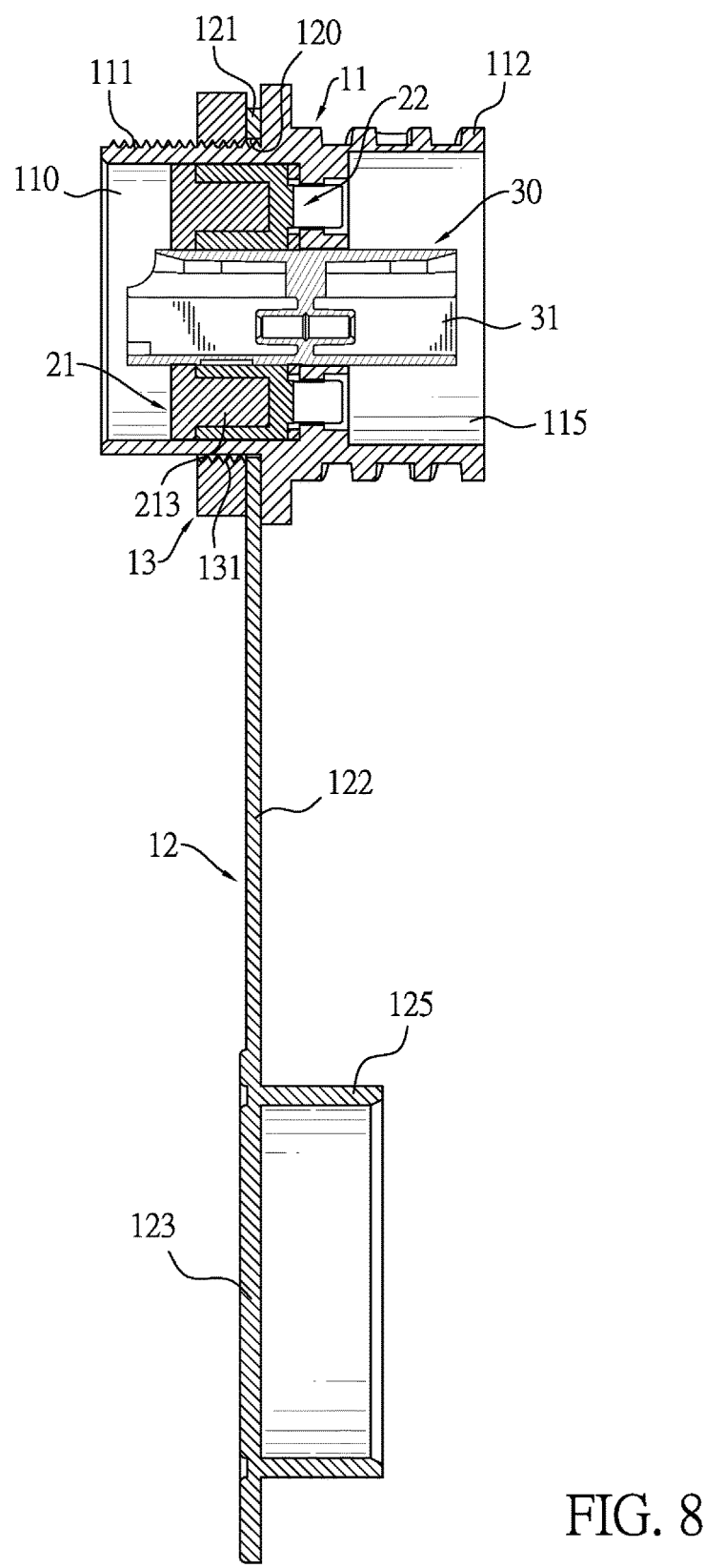
FIG. 8 is a cross sectional side view of the waterproof bushing receptacle connector in FIG. 4.

With further reference to FIG. 8, the optical receptacle connector 30 is mounted detachably in the outer assembling hole 210 of the outer receptacle bushing 21 and the inner assembling hole 220 of the inner receptacle bushing 22.

Figure 10:
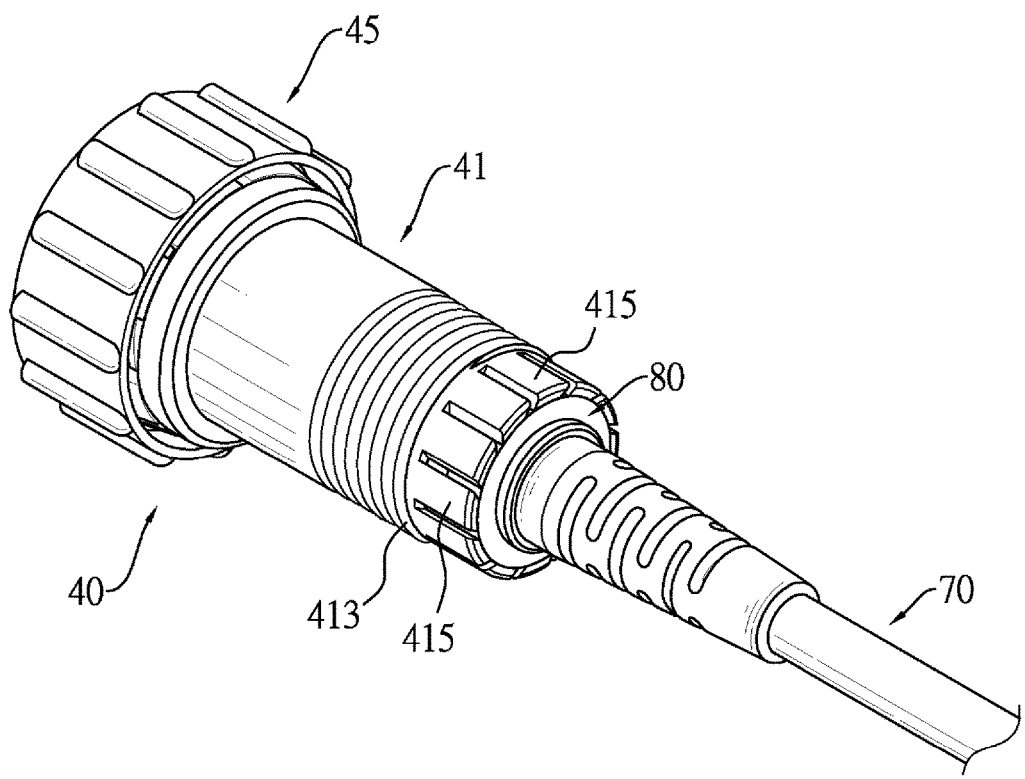
FIG. 10 is a perspective view of a waterproof bushing plug connector of the waterproof bushing connector assembly in FIG. 1.
Figure 11:
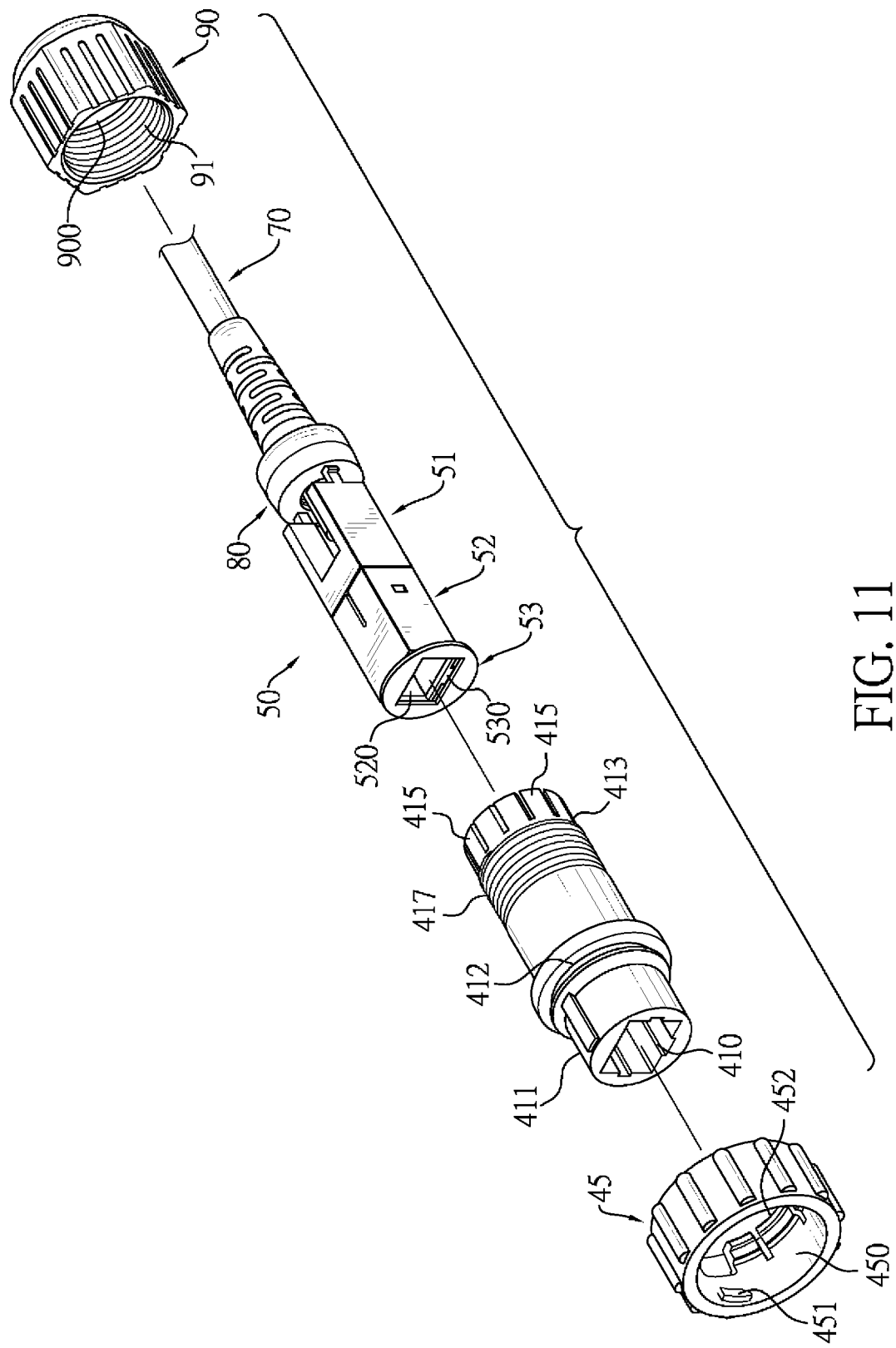
FIG. 11 is a partially exploded perspective view of a waterproof bushing plug connector of the waterproof bushing connector assembly in FIG. 10.
Figure 12:
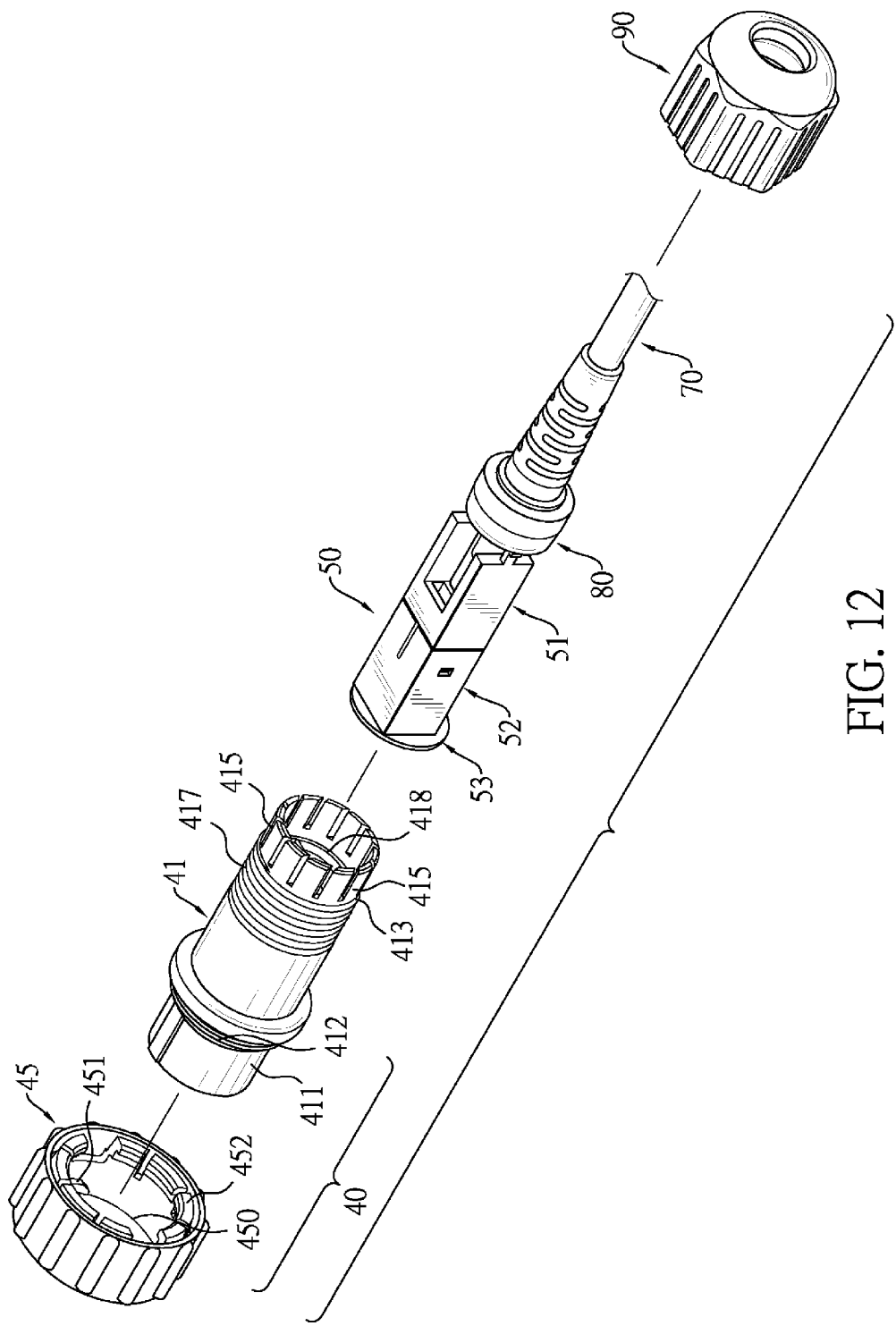
FIG. 12 is another partially exploded perspective view of a waterproof bushing plug connector of the waterproof bushing connector assembly in FIG. 10.

With further reference to FIGS. 10 to 12, the waterproof bushing plug connector 2 is engaged detachably with the waterproof bushing receptacle connector 1 and has a plug housing assembly 40, a waterproof O-ring 80, a plug bushing module 50, an optical plug connector 60 and a rear mounting lid 90.

The plug housing assembly 40 has a plug housing 41 and an engaging ring nut 45.

The plug housing 41 is engaged detachably with the receptacle housing 11 and has a second cavity 410, multiple resilient pressing tabs 415, a compression chamber 418, an annular recess 412 and an outer threaded coupling 417.

The second cavity 410 is defined through the plug housing 41.

The resilient pressing tabs 415 are formed on and protrude axially from a rear end of the plug housing 41.

The compression chamber 418 is defined in the rear end of the plug housing 41, is located among the resilient pressing tabs 415 and communicates with the second cavity 410.

The annular recess 412 is defined radially in the plug housing 41 near a front end of the plug housing 41.

The outer threaded coupling 417 is formed in an outer periphery on the plug housing 41 near the rear end of the plug housing 41.

The waterproof O-ring 80 is mounted inside the compression chamber 418.

The engaging ring nut 45 is mounted rotatably on the front end of the plug housing 41, is engaged detachably with the engaging portion 112 of the receptacle housing 11 and has a nut through hole 450, multiple resilient hooks 452, multiple second limiting teeth 451. The nut through hole 450 is defined through the engaging ring nut 45 and is mounted around the front end of the plug housing 41. The resilient hooks 452 are formed on and protrude radially inward from an inner surface of the nut through hole 450 and are mounted rotatably in the annular recess 412 of the plug housing 41.

The second limiting teeth 451 are formed on and protrude radially inward from the inner surface of the nut through hole 45 and are selectively engaged respectively with the first limiting teeth on the engaging portion 112 of the receptacle housing 11.

Figure 13:
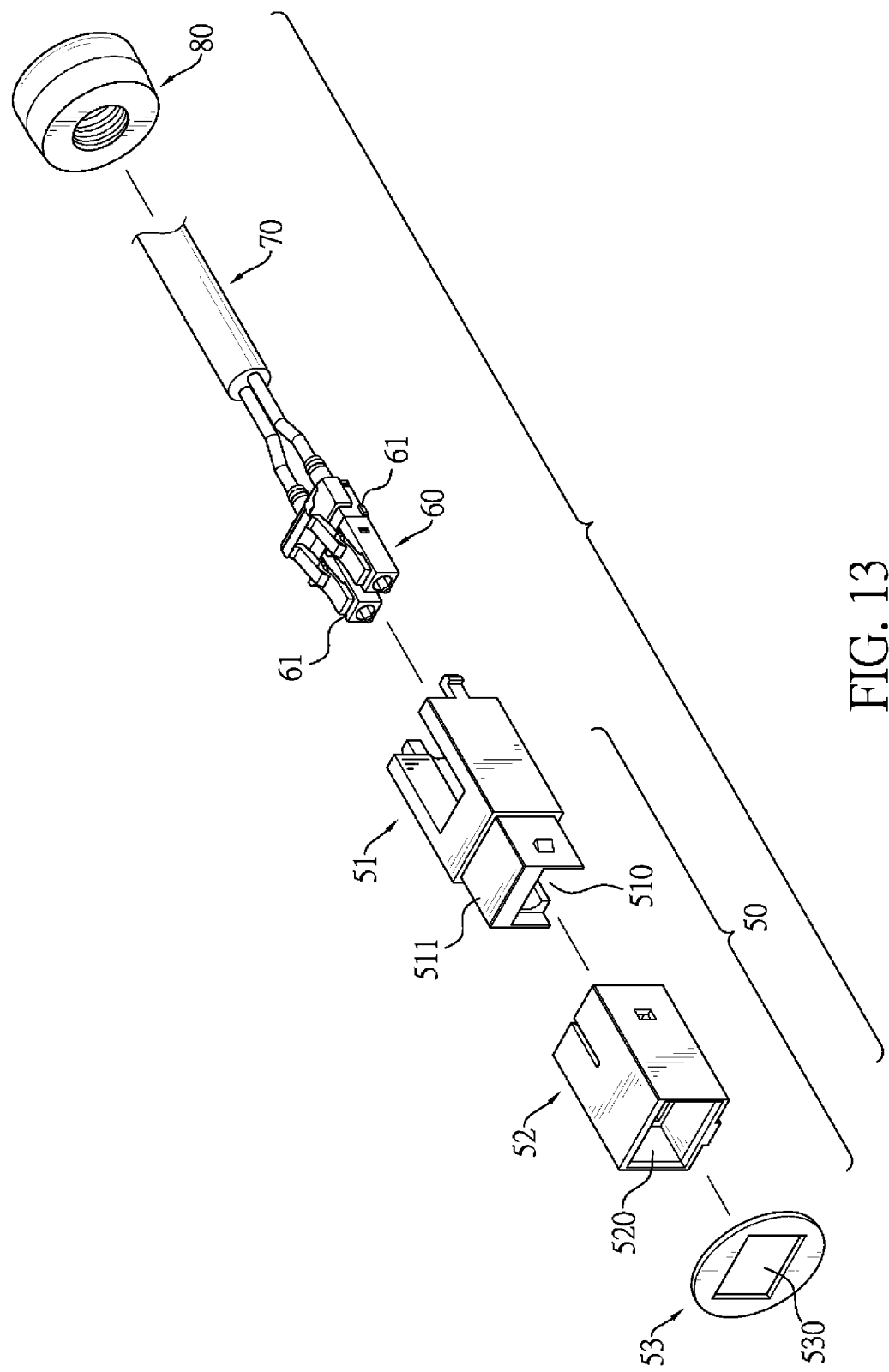
FIG. 13 is an exploded perspective view of a plug bushing module, an optical plug connector, a waterproof O-ring and a cable of the waterproof bushing connector assembly in FIG. 10.
Figure 14:
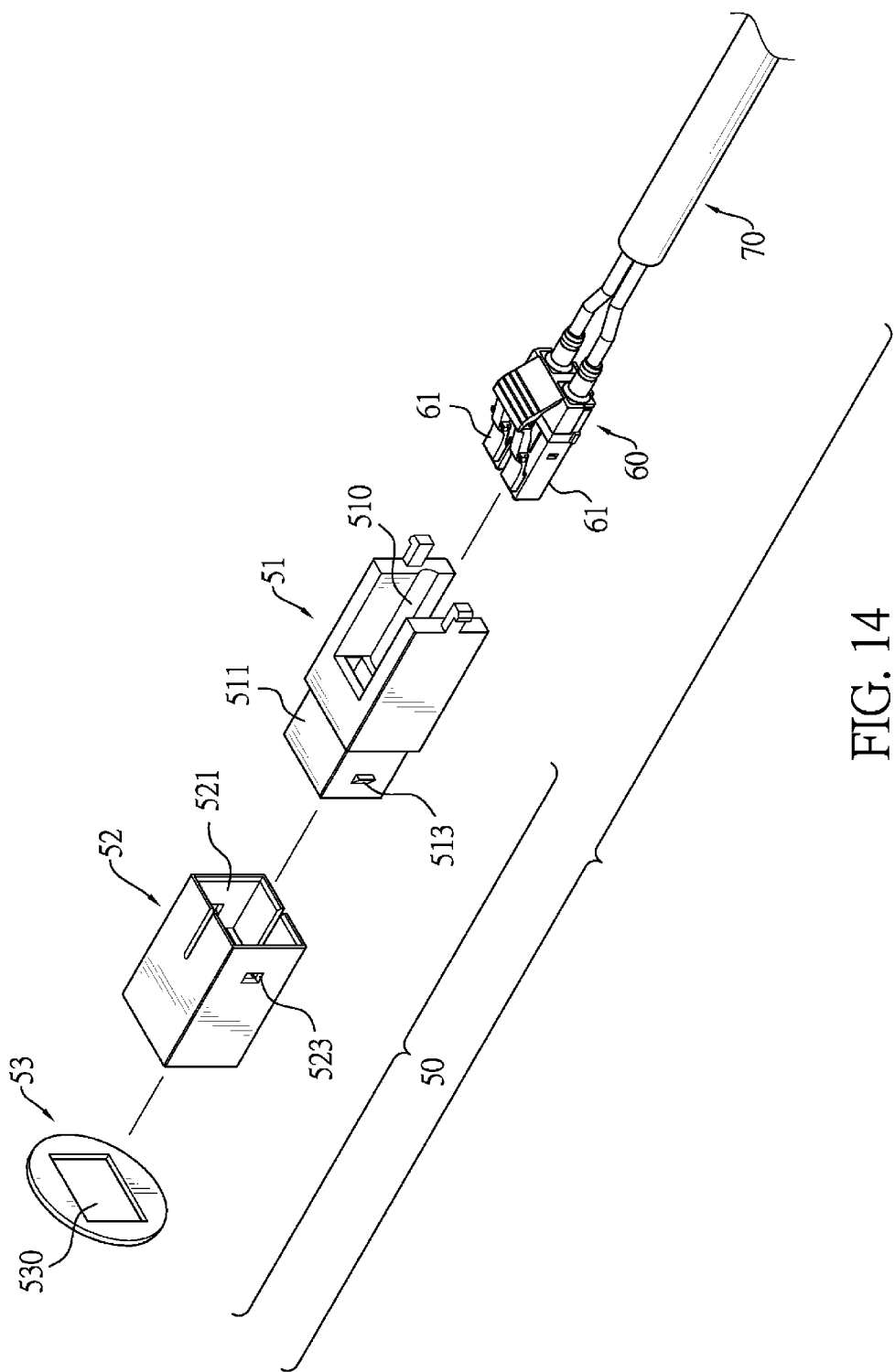
FIG. 14 is another exploded perspective view of the plug bushing module, the optical plug connector, the waterproof O-ring and the cable of the waterproof bushing connector assembly in FIG. 10.
Figure 15:
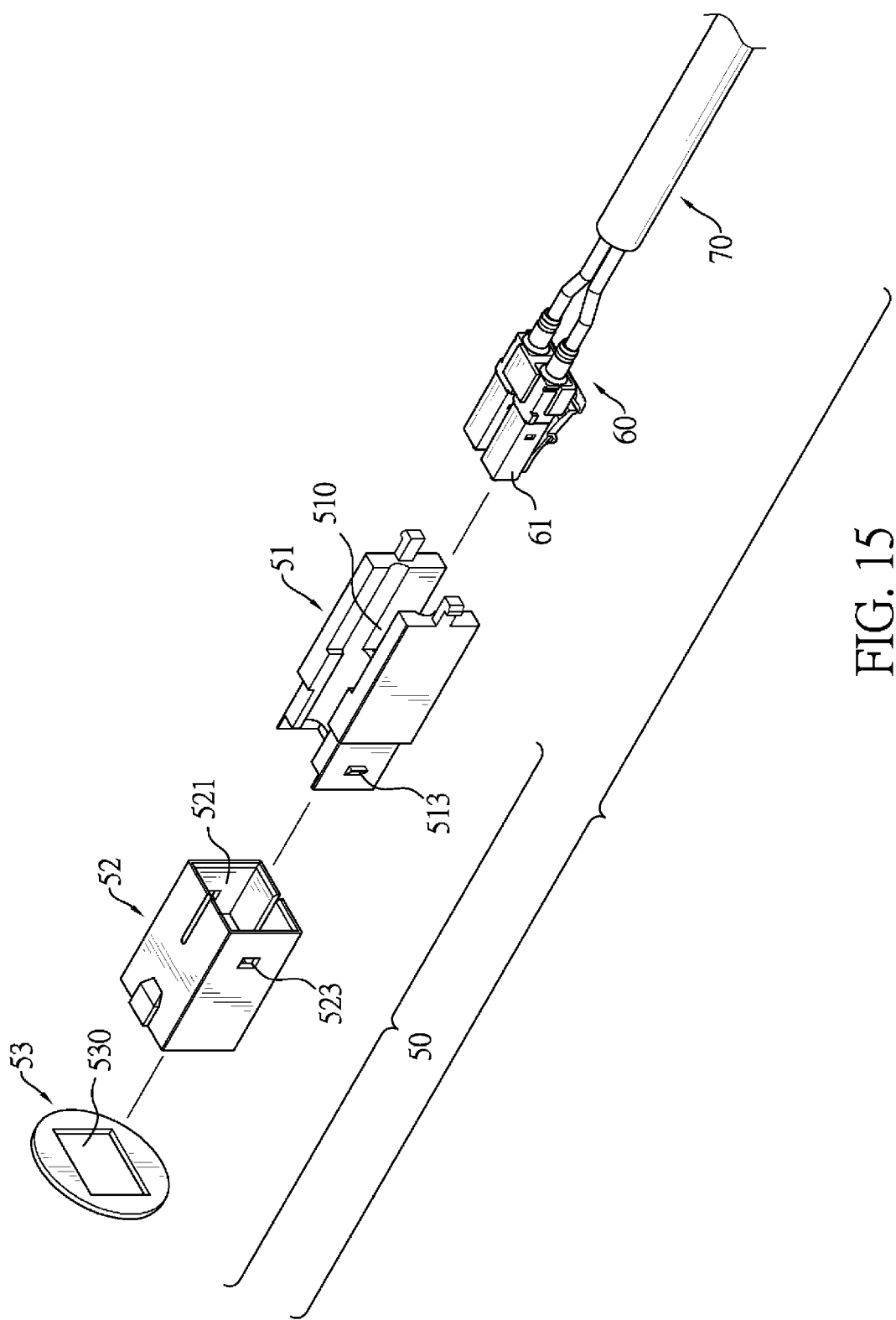
FIG. 15 is still another exploded perspective view of the plug bushing module, the optical plug connector, the waterproof O-ring and the cable of the waterproof bushing connector assembly in FIG. 10.

With further reference to FIGS. 13 to 15, the plug bushing module 50 is mounted detachably in the second cavity 410 of the plug housing 41 and has a front plug bushing 52, a rear plug bushing 51 and a waterproof seal ring 53.

The front plug bushing 52 is mounted detachably in the second cavity 410 and has a front assembling hole 520, a connecting slot 521 and two opposite hooking recesses 523. The front assembling hole 520 is defined through the front plug bushing 52. The connecting slot 521 is defined in a rear end of the front plug bushing 52 and communicates with the front assembling hole 520. The hooking recesses 523 are defined in an inner surface of the connecting slot 521.

The rear plug bushing 51 is mounted detachably on the front plug bushing 52 and has a rear assembling hole 510, a connecting protrusion 511 and two hooking elements 513. The rear assembling hole 510 is defined through the rear plug bushing 51 and communicates with the front assembling hole 521. The connecting protrusion 511 is formed on and protrudes forward from a front end of the rear plug bushing 51 and is mounted detachably in the connecting slot 521. The hooking elements 513 are formed respectively on two opposite sides of the connecting protrusion 511 and hook respectively on the hooking recesses 523.

The waterproof seal ring 53 is mounted around the front end of the plug housing 41 and the front end of the front plug bushing 52 and has an opening 530 defined through the waterproof ring 53.

Figure 16:
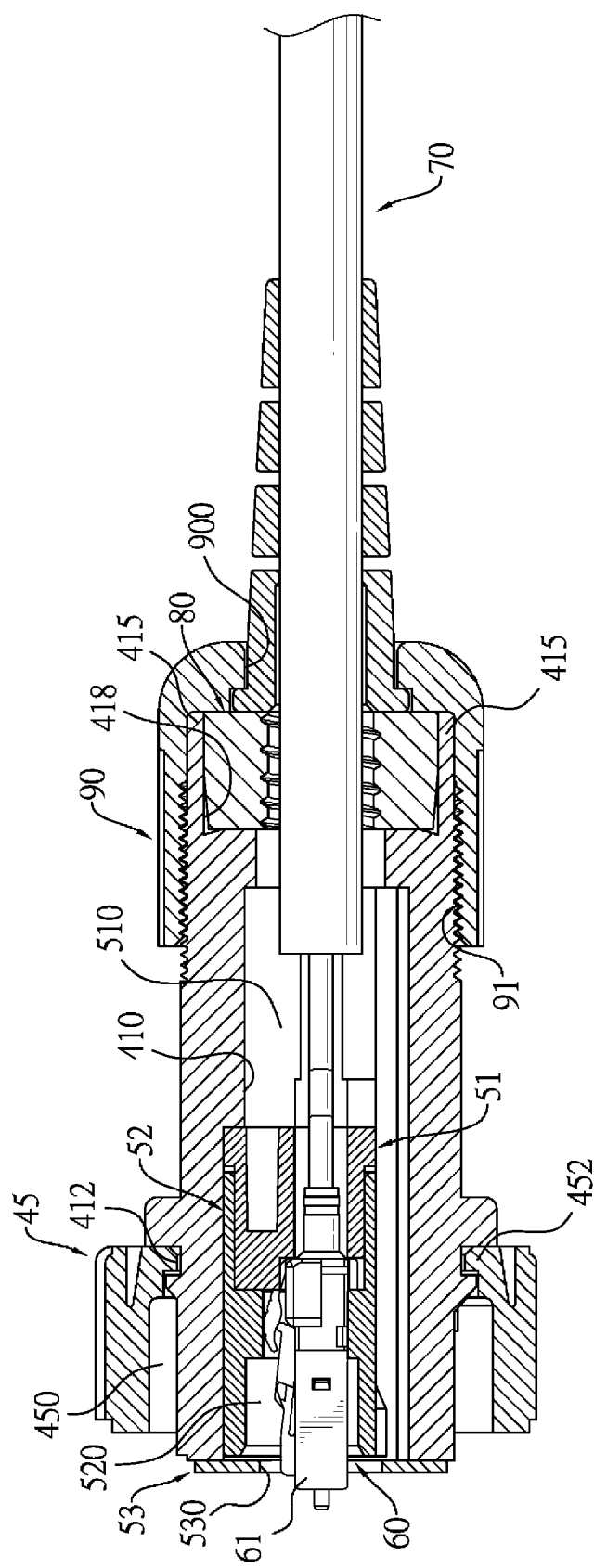
FIG. 16 is a cross sectional side view of the waterproof bushing plug connector of the waterproof bushing connector assembly in FIG. 10.

With further reference to FIG. 16, the optical plug connector 60 is mounted detachably in the front assembling hole 520 and the rear assembling hole 510 of the plug bushing module 50 and is engaged detachably with the optical receptacle connector 50. Furthermore, the optical plug connector 60 extends through the opening 530 of the waterproof seal ring 53.

The rear mounting lid 90 is mounted detachably on the rear end of the plug housing 41 to mount the plug bushing module 50 and the optical plug connector 60 securely in the plug housing 41 and has a mounting hole 900 and an inner mounting thread 91.

The mounting hole 900 is defined through the rear mounting lid 90 and is mounted around the rear end of the plug housing 40. Furthermore, the mounting hole 900 receives and presses the resilient pressing tabs of the plug housing 41 and compress the compression chamber 418 and the waterproof O-ring 80.

The inner mounting thread 91 is formed on an inner surface of the mounting hole 900 and is engaged detachably with the outer threaded coupling 417 of the plug housing 41.

In a preferred embodiment, the optical receptacle connector 30 has two engagement holes 31. The optical plug connector 50 has a pair of main plug bodies 61 engaged detachably and respectively with the two engagement hole 31.

The waterproof bushing connector assembly has the following advantages.

1. The waterproof bushing receptacle connector 1 and the waterproof bushing plug connector may be mounted respectively on an electrical device and a cable of another electrical device. The receptacle housing 11 may be set uniform. The outer shade of the receptacle bushing module 20 may also be set uniform to match the receptacle housing 11. Furthermore, the outer assembling hole 210 and the inner assembling hole 220 of the receptacle bushing module 20 may be modified according to the type of the optical receptacle connector 30. Thus, the electrical device only needs a single, unitary installation opening for receiving accommodating the waterproof bushing receptacle connector 1. Different optical receptacle connectors may be replaced on the electrical device easily and conveniently. Similarly, the plug housing 41 may be set uniform. The outer shade of the plug bushing module 50 may also be set uniform to match the plug housing 41. Furthermore, the front assembling hole 520 and the rear assembling hole 510 of the plug bushing module 50 may be modified according to the type of the optical plug connector 60. Thus, the plug housing 41 and the plug bushing module 50 may be easily and conveniently mounted on the cables of different electrical devices. Therefore, the waterproof bushing connector assembly allows electrical devices to be equipped with variety of optical receptacle connectors for connection with corresponding optical plug connectors on other electrical devices.

2. The protective cap unit 12, waterproof O-ring 80 and waterproof seal ring 53 improves sealing characteristic of the waterproof bushing connector assembly against humid environment and therefore enhances the lifespan of the waterproof bushing connector assembly and related electronic components.

Even though numerous characteristics and advantages of the present invention have been set forth in the foregoing description, together with details of the structure and function of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A waterproof bushing connector assembly comprising:
a waterproof bushing receptacle connector comprising a receptacle housing assembly, a receptacle bushing module and an optical receptacle connector; and
a waterproof bushing plug connector engaged detachably with the waterproof bushing receptacle connector and comprising a plug housing assembly, a plug bushing module, an optical plug connector and a rear mounting lid, wherein
the receptacle housing assembly has a receptacle housing, wherein the receptacle housing has a first cavity defined through the receptacle housing and an engaging portion formed on a rear end of the receptacle housing;
the receptacle bushing module is mounted detachably in the first cavity of the receptacle housing, wherein the receptacle bushing module has an outer receptacle bushing having an outer assembling hole defined through the outer receptacle bushing and an inner receptacle bushing having an inner assembling hole defined through the inner receptacle bushing and communicating with the outer assembling hole;
the optical receptacle connector is mounted detachably in the outer assembling hole of the outer receptacle bushing and the inner assembling hole of the inner receptacle bushing;
the plug housing assembly has a plug housing engaged detachably with the receptacle housing and having a second cavity defined through the plug housing and an engaging ring nut mounted rotatably on a front end of the plug housing, engaged detachably with the engaging portion of the receptacle housing and having a nut through hole defined through the engaging ring nut and mounted around the front end of the plug housing;
the plug bushing module is mounted detachably in the second cavity of the plug housing and has
a front plug bushing mounted detachably in the second cavity, wherein the front plug bushing has a front assembling hole defined through the front plug bushing and a connecting slot defined in a rear end of the front plug bushing and communicating with the front assembling hole; and
a rear plug bushing mounted detachably on the front plug bushing, wherein the rear plug bushing has a rear assembling hole defined through the rear plug bushing and communicating with the front assembling hole and a connecting protrusion formed on and protruding forward from a front end of the rear plug bushing and mounted detachably in the connecting slot;
the optical plug connector is mounted detachably in the front assembling hole and the rear assembling hole of the plug bushing module and is engaged detachably with the optical receptacle connector;
the rear mounting lid is mounted detachably on a rear end of the plug housing to mount the plug bushing module and the optical plug connector securely in the plug housing and has a mounting hole defined through the rear mounting lid and mounted around the rear end of the plug housing.

2. The waterproof bushing connector assembly as claimed in claim 1, wherein the receptacle housing assembly further has a protective cap unit tethered to the receptacle housing, wherein the protective cap unit comprises:

an elastic ring mounted around the receptacle housing and having a ring hole defined through the elastic ring and mounted around the receptacle housing;

a strap formed and protruding from the elastic ring; and a protective cap formed on a distal end of the strap and having a cylindrical outer surface formed on the protective cap and detachably mated with the first cavity on the rear end of the engaging portion of the receptacle housing.

3. The waterproof bushing connector assembly as claimed in claim 2, wherein the receptacle housing assembly further has a gland nut mounted detachably around the front end of the receptacle housing, wherein the gland nut presses the protective cap unit tightly against a flange of the receptacle housing and has an inner thread formed on the gland nut and engaged with the outer threaded coupling of the receptacle housing.

4. The waterproof bushing connector assembly as claimed in claim 3, wherein the plug housing further has multiple resilient pressing tabs formed on and protrude axially from a rear end of the plug housing; and a compression chamber defined in the rear end of the plug housing, located among the resilient pressing tabs and communicating with the second cavity;

the plug bushing connector assembly further has a waterproof O-ring mounted in the compression chamber;

wherein the mounting hole of the rear mounting lid receives and presses the resilient pressing tabs of the plug housing and compress the compression chamber and the waterproof O-ring.

5. The waterproof bushing connector assembly as claimed in claim 4, wherein the outer receptacle bushing has two opposite disks formed on the outer receptacle bushing; and multiple connecting beams formed between the disks;

the inner receptacle bushing is mounted between the disks of the outer receptacle bushing by insert-molding processes; and the connecting beams extend through the inner receptacle bushing.

6. The waterproof bushing connector assembly as claimed in claim 5, wherein the plug housing further has an annular recess defined radially in the plug housing near a front end of the plug housing; and the engaging ring nut has multiple resilient hooks formed on and protrude radially inward from an inner surface of the nut through hole and mounted rotatably in the annular recess of the plug housing.

7. The waterproof bushing connector assembly as claimed in claim 6, wherein the receptacle housing has multiple first limiting teeth formed on the engaging portion; and the engaging ring nut has multiple second limiting teeth formed on and protruding radially inward from the inner surface of the nut through hole and selectively engaged respectively with the first limiting teeth on the engaging portion of the receptacle housing.

8. The waterproof bushing connector assembly as claimed in claim 7, wherein the plug bushing module further has a waterproof seal ring mounted around the front end of the plug housing and the front end of the front plug bushing and having an opening defined through the waterproof ring.

9. The waterproof bushing connector assembly as claimed in claim 8, wherein the plug housing further has an outer threaded coupling formed on the plug housing near the rear end of the plug housing; and the rear mounting lid further has an inner mounting thread formed on an inner surface of the mounting hole and engaged detachably with the outer threaded coupling of the plug housing.

10. The waterproof bushing connector assembly as claimed in claim 9, wherein the optical receptacle connector has at least one engagement hole; and the optical plug connector has at least one main plug body engaged detachably and respectively with the at least one engagement hole.

11. The waterproof bushing connector assembly as claimed in claim 10, wherein the front plug bushing further has two opposite hooking recesses defined in an inner surface of the connecting slot; and the rear plug bushing further has two hooking elements formed respectively on two opposite sides of the connecting protrusion and hooking respectively on the hooking recesses.

12. A waterproof bushing plug connector comprising:

a plug housing assembly having a plug housing having a second cavity defined through the plug housing; and an engaging ring nut mounted rotatably on a front end of the plug housing and having a nut through hole defined through the engaging ring nut and mounted around the front end of the plug housing;

a plug bushing module mounted detachably in the second cavity of the plug housing and having a front plug bushing mounted detachably in the second cavity and having a front assembling hole defined through the front plug bushing; and a connecting slot defined in a rear end of the front plug bushing and communicating with the front assembling hole; and a rear plug bushing mounted detachably on the front plug bushing and having a rear assembling hole defined through the rear plug bushing and communicating with the front assembling hole; and a connecting protrusion formed on and protruding forward from a front end of the rear plug bushing and mounted detachably in the connecting slot;

an optical plug connector mounted detachably in the front assembling hole and the rear assembling hole of the plug bushing module;

a rear mounting lid mounted detachably on a rear end of the plug housing to mount the plug bushing module and the optical plug connector securely in the plug housing and having a mounting hole defined through the rear mounting lid and mounted around the rear end of the plug housing.

* * * * *